(12) United States Patent
Goredema et al.

US008123344B2

(10) Patent No.: US 8,123,344 B2
(45) Date of Patent: Feb. 28, 2012

(54) INK CARRIERS CONTAINING SURFACE MODIFIED NANOPARTICLES, PHASE CHANGE INKS INCLUDING SAME, AND METHODS FOR MAKING SAME

(75) Inventors: Adela Goredema, Mississauga (CA); Maria N. V. McDougall, Oakville (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 798 days.

(21) Appl. No.: 12/185,725

(22) Filed: Aug. 4, 2008

(65) Prior Publication Data
US 2010/0028537 A1 Feb. 4, 2010

(51) Int. Cl.
*G01D 11/00* (2006.01)
(52) U.S. Cl. ........ 347/99; 347/100; 427/256; 106/31.61
(58) Field of Classification Search ............ 347/85–100; 106/13, 31.61, 31.85, 311, 31.13; 427/511, 427/125, 58, 256
See application file for complete search history.

(56) References Cited

U.S. PATENT DOCUMENTS

| | | | |
|---|---|---|---|
| 3,172,892 A | 3/1965 | Le Suer et al. ................ 548/546 |
| 3,202,678 A | 8/1965 | Stuart et al. .................... 548/546 |
| 3,219,666 A | 11/1965 | Norman et al. ................ 544/383 |
| 3,280,034 A | 10/1966 | Anzenberger et al. ........ 508/285 |
| 3,361,673 A | 1/1968 | Stuart et al. .................... 508/293 |
| 3,381,022 A | 4/1968 | Le Suer et al. ................ 554/223 |
| 3,442,808 A | 5/1969 | Traise et al. ................... 508/192 |
| 3,653,932 A | 4/1972 | Berry et al. ................. 106/31.29 |
| 3,912,764 A | 10/1975 | Palmer, Jr. .................... 549/255 |
| 3,996,059 A | 12/1976 | Stansfield et al. ............ 106/413 |
| 4,234,435 A | 11/1980 | Meinhardt et al. ............ 508/192 |
| 4,251,824 A | 2/1981 | Hara et al. ....................... 347/57 |
| 4,390,369 A | 6/1983 | Merritt et al. ................ 106/31.3 |
| 4,410,899 A | 10/1983 | Haruta et al. ................... 347/56 |
| 4,412,224 A | 10/1983 | Sugitani ......................... 347/65 |
| 4,484,948 A | 11/1984 | Merritt et al. ................ 106/31.3 |
| 4,490,731 A | 12/1984 | Vaught ............................ 347/88 |
| 4,532,530 A | 7/1985 | Hawkins ......................... 347/62 |
| 4,601,777 A | 7/1986 | Hawkins et al. ................ 216/27 |
| 4,684,956 A | 8/1987 | Ball ................................. 347/88 |
| 4,830,671 A | 5/1989 | Frihart et al. .............. 106/31.29 |
| 4,851,045 A | 7/1989 | Taniguchi ................... 106/31.31 |
| 4,889,560 A | 12/1989 | Jaeger et al. ............... 106/31.29 |
| 4,889,761 A | 12/1989 | Titterington et al. ......... 428/32.1 |
| 5,006,170 A | 4/1991 | Schwarz et al. ............. 106/31.3 |
| 5,151,120 A | 9/1992 | You et al. ................... 106/31.29 |
| 5,194,638 A | 3/1993 | Frihart et al. ................... 554/47 |
| 5,195,430 A | 3/1993 | Rise ............................... 100/168 |
| 5,221,335 A | 6/1993 | Williams et al. .............. 524/560 |
| 5,231,135 A | 7/1993 | Machell et al. ................ 525/123 |
| 5,286,799 A | 2/1994 | Harrison et al. ............... 525/285 |
| 5,290,348 A | 3/1994 | Auslander |
| 5,319,030 A | 6/1994 | Harrison et al. ............... 525/285 |
| 5,372,852 A | 12/1994 | Titterington et al. ......... 427/288 |
| 5,389,958 A | 2/1995 | Bui et al. ....................... 347/103 |
| 5,496,879 A | 3/1996 | Griebel et al. ................ 524/320 |
| 5,597,856 A | 1/1997 | Yu et al. ......................... 524/227 |
| 5,621,022 A | 4/1997 | Jaeger et al. ................... 523/161 |
| 5,750,604 A | 5/1998 | Banning et al. ................ 524/187 |
| 5,780,528 A | 7/1998 | Titterington et al. ......... 523/161 |
| 5,782,966 A | 7/1998 | Bui et al. ..................... 106/31.43 |
| 5,783,658 A | 7/1998 | Banning et al. ................ 101/491 |
| 5,827,918 A | 10/1998 | Titterington et al. ......... 524/590 |
| 5,830,942 A | 11/1998 | King et al. ..................... 524/590 |
| 5,919,839 A | 7/1999 | Titterington et al. ......... 523/161 |
| 6,174,937 B1 | 1/2001 | Banning et al. ................ 523/160 |
| 6,255,432 B1 | 7/2001 | Evans et al. ..................... 528/49 |
| 6,309,453 B1 | 10/2001 | Banning et al. ............. 106/31.29 |
| 6,472,523 B1 | 10/2002 | Banning et al. ................ 540/128 |
| 6,476,219 B1 | 11/2002 | Duff et al. ...................... 540/128 |
| 6,547,380 B2 | 4/2003 | Smith et al. ..................... 347/96 |
| 6,576,747 B1 | 6/2003 | Carlini et al. .................. 534/649 |
| 6,576,748 B1 | 6/2003 | Carlini et al. .................. 534/649 |
| 6,590,082 B1 | 7/2003 | Banning et al. ................ 534/649 |
| 6,646,111 B1 | 11/2003 | Carlini et al. .................. 534/649 |
| 6,663,703 B1 | 12/2003 | Wu et al. ..................... 106/31.29 |
| 6,673,139 B1 | 1/2004 | Wu et al. ..................... 106/31.29 |
| 6,696,552 B2 | 2/2004 | Mayo et al. .................... 534/649 |
| 6,702,884 B2 | 3/2004 | Brown ......................... 106/31.61 |
| 6,713,614 B2 | 3/2004 | Carlini et al. .................. 534/649 |
| 6,726,755 B2 | 4/2004 | Titterington et al. ....... 106/31.29 |
| 6,755,902 B2 | 6/2004 | Banning et al. ............. 106/31.29 |
| 6,841,590 B2 | 1/2005 | Modi et al. ..................... 523/160 |
| 6,858,070 B1 | 2/2005 | Wong et al. ................. 106/31.61 |
| 6,860,930 B2 | 3/2005 | Wu et al. ..................... 106/31.29 |

(Continued)

FOREIGN PATENT DOCUMENTS

EP 0187352 7/1986

(Continued)

OTHER PUBLICATIONS

European Search Report issued for European Patent Application No. 09167190.9-2102 (corresponding to U.S. Appl. No. 12/185,725), dated Oct. 30, 2009, 4 pages.
Canadian Office Action issued for Canadian Patent Application No. 2,674,216 (corresponding to U.S. Appl. No. 12/185,725), dated Feb. 21, 2011, 2 pages.
English Abstract for German Patent Publication DE 4205636AL, Aug. 1993.
English Abstract for German Patent Publication DE 4205713AL, Mar. 1996.
Stéphanie Etienne et al., "Effects of Incorporation of Modified Silica Nanoparticles on the Mechanical and Thermal Properties of PMMA" Journal of Thermal Analysis and Calorimetry, vol. 87 (2007), pp. 101-104.
Rahul P. Bagwe et al., "Surface Modification of Silica Nanoparticles to Reduce Aggregation and Nonspecific Binding," Langmuir, vol. 22, No. 9, 2006, pp. 4357-4362.
U. Nolte et al., "Additive Containing Nano Metal Oxides for Enhanced Scratch Resistance in Coating Formulations," NSTI-Nanotech, vol. 4, 2007, pp. 199-201.

(Continued)

*Primary Examiner* — Ellen Kim
(74) *Attorney, Agent, or Firm* — Marylou J. Lavoie

(57) ABSTRACT

An ink carrier comprising a dispersion of at least one of silica nanoparticles surface modified with a hydrophobic group or metal oxide nanoparticles surface modified with a hydrophobic group exhibiting a substantially uniform distribution of said nanoparticles discretely distributed therewithin, said ink carrier being resistant to substantial aggregation of said nanoparticles distributed therewithin.

22 Claims, No Drawings

U.S. PATENT DOCUMENTS

| | | | |
|---|---|---|---|
| 6,906,118 B2 | 6/2005 | Goodbrand et al. | 523/160 |
| 6,958,406 B2 | 10/2005 | Banning et al. | 552/243 |
| 7,053,227 B2 | 5/2006 | Jaeger et al. | 552/247 |
| 7,259,101 B2 * | 8/2007 | Zurcher et al. | 438/700 |
| 7,371,456 B2 * | 5/2008 | Nohr et al. | 428/403 |
| 7,563,314 B2 * | 7/2009 | Breton et al. | 106/31.43 |
| 7,758,961 B2 * | 7/2010 | Jones et al. | 428/403 |
| 2002/0077381 A1 | 6/2002 | Frahn et al. | |
| 2007/0119340 A1 | 5/2007 | Breton et al. | 106/31.43 |
| 2007/0131138 A1 * | 6/2007 | Wong et al. | 106/31.61 |
| 2007/0283846 A1 | 12/2007 | Breton et al. | |
| 2008/0021147 A1 | 1/2008 | Lin | 524/493 |
| 2009/0082489 A1 * | 3/2009 | Breton et al. | 523/200 |
| 2010/0116424 A1 * | 5/2010 | Breton et al. | 156/230 |

FOREIGN PATENT DOCUMENTS

| | | |
|---|---|---|
| EP | 0206286 | 12/1986 |
| EP | 0776963 | 6/1997 |
| EP | 1199337 | 4/2002 |
| EP | 1975209 | 10/2008 |
| GB | 2238792 | 6/1991 |
| GB | 2290793 | 1/1993 |
| GB | 2294939 | 5/1996 |
| GB | 2305670 | 4/1997 |
| GB | 2305928 | 4/1997 |
| WO | WO 94/04619 | 3/1994 |
| WO | WO 94/14902 | 7/1994 |
| WO | WO 95/04760 | 2/1995 |
| WO | WO 96/14364 | 5/1996 |
| WO | WO 97/12003 | 4/1997 |
| WO | WO 97/13816 | 4/1997 |
| WO | WO 97/33943 | 9/1997 |
| WO | WO2002/228660 | 4/2001 |
| WO | WO2006/125736 | 11/2006 |

OTHER PUBLICATIONS

János Hajas et al., "Surface Modified Silica Nanoparticles to Improve Scratch Resistance of Solventborne Coatings," Pitture e Vernici—European Coatings, Apr. 2006, pp. 19-23.

Handoko Subawi, "Micro-composite Strength and Nano-filler Effects," Journal of Composite Materials, vol. 42, No. 6/2008, pp. 603-629.

* cited by examiner

INK CARRIERS CONTAINING SURFACE MODIFIED NANOPARTICLES, PHASE CHANGE INKS INCLUDING SAME, AND METHODS FOR MAKING SAME

BACKGROUND

Disclosed herein are ink carriers, phase change inks and methods for making same. More specifically, disclosed herein are ink carriers and phase change inks including at least one of surface modified silica nanoparticles and surface modified metal oxide nanoparticles which can be used in direct and indirect printing processes. In embodiments, the phase change inks are of the low energy type. In various embodiments, the ink carriers comprise a dispersion of at least one of surface modified silica nanoparticles and surface modified metal oxide nanoparticles.

Another embodiment is directed to a method which comprises (a) incorporating into an ink jet printing apparatus the above-described phase change ink composition; (b) melting the ink; (c) causing droplets of the melted ink to be ejected in an imagewise pattern onto the surface of the recording substrate, either directly or via an intermediate heated transfer belt or drum, where the droplets quickly solidify to form a predetermined pattern of solidified ink drops.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby incorporated herein.

Ink jet printing processes may employ inks that are solid at room temperature and liquid at elevated temperatures. Such inks may be referred to as hot melt inks or phase change inks. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below about 40° C. and have a viscosity of from about 5 to about 15 centipoise at a jetting temperature of from about 100° C. to about 180° C., for example from 120° C. to about 160° C. or from about 125° C. to about 150° C.

See Nolte, et al., "Additives Containing Nano Metal Oxides for Enhanced Scratch Resistance in Coating Formulations," NSTI-Nanotech 2007, Vol. 4, pp. 199-201, which is hereby incorporated by reference herein. See also Etienne, et al., "Effects of Incorporation of Modified Silica Nanoparticles on the Mechanical and Thermal Properties of PMMA," Journal of Thermal Analysis and Calorimetry, 2007, 87, pp. 101-104, which is hereby incorporated by reference herein. See also, J. Hajas, et al., "Surface Modified Silica Nanoparticles to Improve Scratch Resistance of Solvent Borne Coatings," European Coatings, 2006, 82(46), pp. 19-23, which is hereby incorporated by reference herein. Also see R. P. Bagwe, et al., "Surface Modification of Silica Nanoparticles to Reduce Aggregation and Nonspecific Bonding," Langmuir, Vol. 22, No. 9, 2006, page 4357-4362, which is hereby incorporated by reference herein.

While known compositions and processes are suitable for their intended purposes, the images currently produced by the phase change inks in many instances, exhibit poor scratch resistance and image permanence. A need remains for improved phase change inks, and more specifically, phase change inks which exhibit improved image quality and robustness, that is resistance to scratch, crease and abrasion with substantially no smear, and image permanence. Additionally, a need remains for phase change inks that print successfully on paper and transparency stock. Furthermore, there is a need for phase change inks that generate prints with good performance in automatic document feeders.

The appropriate components and process aspects of the each of the foregoing may be selected for the present disclosure in embodiments thereof.

SUMMARY

The present disclosure is directed to an ink carrier which is used in forming a phase change ink composition, the ink carrier comprising a dispersion of at least one of silica nanoparticles surface modified with a hydrophobic group or metal oxide nanoparticles surface modified with a hydrophobic group exhibiting a substantially uniform distribution of said nanoparticles discretely distributed therewithin, said ink carrier being resistant to substantial aggregation of said nanoparticles distributed therewithin.

Further disclosed herein are low energy solid inks comprising the ink carrier described above. The inks exhibit a substantially high degree of nanoparticle uniformity and a substantially reduced degree of nanoparticle aggregation.

Also disclosed is a method for producing an ink carrier comprising forming a dispersion of at least one of silica nanoparticles surface modified with a hydrophobic group and metal oxide nanoparticles surface modified with a hydrophobic group; and forming an ink carrier comprising said dispersion of nanoparticles, the ink carrier exhibiting a substantially uniform distribution of said nanoparticles discretely distributed therewithin, and having a substantially increased resistance to aggregation of said nanoparticles distributed therewithin. In embodiments, the method further comprises melt mixing the ink components and slowly adding the silica to the melted solution while vigorously stirring the ink to enable dispersion of the nanoparticles. Another embodiment of this disclosure is directed to a method which comprise (a) incorporating into an ink jet printing apparatus an ink composition comprising (1) the above-described ink carrier and (2) a colorant; (b) melting the ink; and (c) causing droplets of the melted ink to be ejected in an imagewise pattern onto a substrate. Advantageously, in embodiments herein, the surface modified nanoparticles are dispersed in the ink vehicle thereby providing robustness and reducing or eliminating altogether the problem of aggregation and clogging of print heads.

DETAILED DESCRIPTION

The present disclosure is directed to an ink carrier comprising a dispersion of at least one of surface modified silica nanoparticles and surface modified metal oxide nanoparticles. Phase change inks herein can comprise the above-described ink carrier and a colorant. Colorants can comprise any suitable colorant including pigmented colorants and dye based colorants. The phase change ink can have a substantially low surface energy.

Nanometer sized particles, typically in the form of a dispersion of the nanoparticles, can be provided to improve ink robustness. The dispersion of the nanoparticles is combined with the ink carrier so that there is a substantially uniform distribution of the nanoparticles within the ink matrices. Moreover, the ink is formed with a substantially reduced aggregation of the nanoparticles so that they are discretely distributed.

In embodiments, surface modified silica nanoparticles are provided in an ink carrier to improve scratch resistance of solid ink prints. Scratch resistance is enhanced by modifying the surface energy of the solid ink in a manner that enables the surface modified silica nanoparticles to emerge to the surface of the substrate protecting the wax image underneath. While not being bound to any particular theory, in embodiments herein, incorporating surface modified metal oxide nanoparticles having a higher surface area and surface modified to have hydrophobic surfaces enables the nanoparticle to bind and/or interact with various chemical species and substrates and increases compatibility with the ink vehicle. By providing a more compatible interaction with the ink vehicle, a large improvement in scratch resistance is achieved using small particle loading levels. In embodiments, the mechanical properties of wax based ink are improved by exploiting the physical characteristics or nature of fumed silica. As the wax cools down upon deposition on a substrate, the hydrophobic groups of the silica arrange themselves towards the surface providing more robustness and scratch resistance. Using low levels of metal oxide or silica nanoparticles allows improved scratch resistance with no adverse effect on ink properties such as viscosity. Further, use of nanoparticles surface modified to enhance compatibility with the ink vehicle provides well dispersed nanoparticles with substantially reduced aggregation.

It has been demonstrated that appropriate surface modification of inorganic nanoparticles improves the compatibility and adhesion between filler particles and organic matrix. See, for example, S. Etienne, et al., Journal of Thermal Analysis and Calorimetry, 2007, 87, pp. 101-104, which is hereby incorporated by reference herein. Unmodified (hydrophilic) nano-silica particles are highly transparent, but they have been found to be inferior in terms imparting scratch resistance enhancement of clear coats. Nano metal oxide particle surface chemistry modification enables the dispersion of the nanoparticles without the need for additional dispersion steps.

Modified nanoparticles can be represented by the general formula

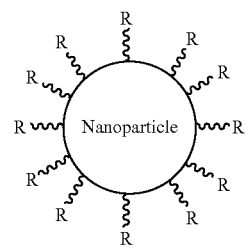

1)

wherein the number of R groups is selected depending on the type of silica nanoparticle selected. In embodiments, the R groups are provided in a quantity sufficient to impart the desired surface modification, for example, to impart hydrophobicity. In embodiments, at least about four (4) R groups are provided. In the structure (1) illustrated above, the R groups are covalently bonded to the nanoparticle, the covalent bond illustrated by the wavy lines.

In one embodiment R is (i) an alkyl group (including linear and branched, cyclic and acyclic, and substituted and unsubstituted alkyl groups, and wherein hetero atoms, such as oxygen, nitrogen, sulfur, silicon, phosphorus, boron, and the like, either may or may not be present in the alkyl group), in one embodiment with at least about 1 carbon atom, in another embodiment with at least about 4 carbon atoms, and in one embodiment with no more than about 50 carbon atoms, in another embodiment with no more than about 20 carbon atoms, although the number of carbon atoms can be outside of these ranges, (ii) an arylalkyl group (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, boron, and the like, either may or may not be present in either the aryl or the alkyl portion of the arylalkyl group), in one embodiment with at least about 6 carbon atoms, in another embodiment with at least about 7 carbon atoms, and in one embodiment with no more than about 50 carbon atoms, in another embodiment with no more than about 20 carbon atoms, although the number of carbon atoms can be outside of these ranges, or (iii) an alkylaryl group (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, boron, and the like, either may or may not be present in either the aryl or the alkyl portion of the alkylaryl group), in one embodiment with at least about 6 carbon atoms, in another embodiment with at least about 7 carbon atoms, and in one embodiment with no more than about 50 carbon atoms, in another embodiment with no more than about 20 carbon atoms, although the number of carbon atoms can be outside of these ranges, wherein if substituted, the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In another embodiment, R is (i) an alkyl group having at least one ethylenic unsaturation therein (including linear and branched, cyclic and acyclic, and substituted and unsubstituted alkyl groups, and wherein hetero atoms, such as oxygen, nitrogen, sulfur, silicon, phosphorus, boron, and the like, either may or may not be present in the alkyl group), in one embodiment with at least about 2 carbon atoms, in another embodiment with at least about 4 carbon atoms, and in one embodiment with no more than about 50 carbon atoms, in another embodiment with no more than about 20 carbon atoms, although the number of carbon atoms can be outside of these ranges, (ii) an arylalkyl group having at least one ethylenic unsaturation therein (including substituted and unsubstituted arylalkyl groups, wherein the alkyl portion of the arylalkyl group can be linear or branched, cyclic or acyclic, and substituted or unsubstituted, and wherein hetero atoms, such as oxygen, nitrogen, sulfur, silicon, phosphorus, boron, and the like, either may or may not be present in either the aryl or the alkyl portion of the arylalkyl group), in one embodiment with at least about 8 carbon atoms, in another embodiment with at least about 9 carbon atoms, and in one embodiment with no more than about 50 carbon atoms, in another embodiment with no more than about 20 carbon atoms, although the number of carbon atoms can be outside of these ranges, or (iii) an alkylaryl group having at least one ethylenic unsaturation therein (including substituted and unsubstituted alkylaryl groups, wherein the alkyl portion of the alkylaryl group can be linear or branched, cyclic or acyclic, and substituted or unsubstituted, and wherein hetero atoms, such as oxygen, nitrogen, sulfur, silicon, phosphorus, boron, and the like, either may or may not be present in either the aryl or the alkyl portion of the alkylaryl group in one embodiment with at least about 8 carbon atoms, in another embodiment with at least about 9 carbon atoms, and in one embodiment with no more than about 50 carbon atoms, in another embodiment with no more than about 20 carbon atoms, although the number of carbon atoms can be outside of these ranges, wherein, if substituted, the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring.

In embodiments, the hydrophobic group is an alkyl group, an arylalkyl group, or an alkylaryl group. In further embodiments, the alkyl group, arylalkyl group, or alkyl aryl group contains at least one hetero atom. Examples of specific R groups include, but are not limited to, dimethyl polysiloxanes (covalent bonding) which, when dispersed in organic media, prevent agglomeration and flocculation. Other suitable groups include hexadimethyl silane and polydimethyl siloxane.

In an embodiment herein, a surface modification is selected to provide a compatible interaction with the organic matrix employed and to have a desired influence on properties. Surface modification of nanoparticles determines the interaction with the surrounding. The nanoparticle core is designed to impart desired mechanical, chemical, and/or electrical properties. The shell is designed to impart desired solubility, reactivity, and compatibility properties. For example, nanoparticle cores such as silicon, titanium, or aluminum are hard metals and have great impact on mechanical properties. When using these materials, a surface treatment is selected to enable compatibility, solubility and reactivity to match the media to be used. In embodiments, the process provides the advantage of the ability to use low loadings which will not interfere with jetting properties of the ink, for example. In selected embodiments, the nanoparticles are evenly dispersed in the ink.

The mechanism of electrostatic repulsion or steric hindrance-based stabilization is used for the prevention of silica nanoparticle agglomeration. Some nanoparticle surface designs involve an optimum balance between inert and active surface functional groups to achieve minimal nanoparticle aggregation and reduce nanoparticle nonspecific binding. For example, in embodiments herein, carboxylate groups are used to help to increase the shear or slipping plane of the octadecyl groups on the nanoparticle due to a more electrostatic and steric environment.

Any suitable or desired surface modified silica nanoparticles that will be compatible with a non-polar solid ink system can be selected for the ink carriers herein. Examples include, but are not limited to, NANOBYK®-3650, commercially available from Byk-Chemie. The surface modified silica nanoparticle, NANOBYK®-3650 increases the scratch resistance of solvent-borne coating without affecting gloss, haze or other coating properties. The particles are covalently bonded with polydimethyl siloxane (PDMS). Other examples include, but are not limited to, PDMS modified silica particles; HO5TD, H13TD, H20TD, H30TD, hexadimethyl silane (HMS) modified silica particles, HO5TM, H13TM, H20TM, H30TM, and HDMS/PDMS modified particles, HO5TX, H13TX, H20TX, H30TX, all available from Wacker Chemie with particle sizes ranging from about 8 to about 50 nanometers.

The surface modified particles can, in one embodiment, be dispersed by slowly adding the powdered particles to a melted ink solution which can include some or all of the ink components. The particles can be dispersed by applying energy to the solution.

The surface modified nanoparticles can, in another embodiment herein, be dispersed in a solvent, such as a low boiling solvent, and can then be transferred from the solvent phase to the ink vehicles where they are uniformly disseminated in the ink carrier and in the low energy phase change ink. Particles suspended in solvent are added to the ink and the solvent is then evaporated. The solvent can in one embodiment be an organic solvent, and in another embodiment be a low boiling organic solvent. These solvents in one embodiment have a boiling point of equal to or less than about 140° C., in another embodiment have a boiling point of equal to or less than about 130° C., and in a further embodiment have a boiling point equal to or less than about 120° C., although the boiling point can be outside of these ranges. In one embodiment these solvents can be low boiling alcohols, glycols, glycol ethers, glycol acetates, ketones, acetamides, and the like, as well as mixtures thereof. In another embodiment, these solvents can be methanol, isopropanol, ethylene glycol, ethylene glycol mono-n-propyl ether, methyl ethyl ketone, methyl isobutyl ketone, propylene glycol mono-methyl ether acetate, N,N-dimethyl acetamide, and the like, as well as mixtures thereof.

The loading of silica in the solvent in one embodiment is at least about 15% by weight, in another embodiment is at least about 20% by weight, and in a further embodiment is at least about 25% by weight, in one embodiment equal to or less than about 45 weight percent, in another embodiment equal to or less than about 40% by weight, and in a further embodiment equal to or less than about 35% by weight, although the loading can be outside of these ranges. In embodiments, the surface modified nanoparticles are present in the ink carrier in an amount equal to or less than about 40% by weight based upon the total weight of the ink carrier.

The surface modified nanoparticles are of any desired or effective particle size, in one embodiment having a particle size equal to or less than about 300 nanometers, in another embodiment having a particle size equal to or less than about 100 nanometers, and in yet another embodiment having a particle size equal to or less than about 50 nanometers, although the particle size can be outside of these ranges.

The surface modified nanoparticles (dry-weight) are present in the ink carrier in any desired or effective amount, in one embodiment of at least about 0.5% by weight of the ink, in another embodiment of at least about 5% by weight of the ink, and in yet another embodiment of at least about 10% by weight of the ink, and in one embodiment equal to or less than about 40% by weight of the ink, in another embodiment equal to or less than about 35% by weight of the ink, and in yet another embodiment equal to or less than about 25% by weight of the ink, although the amount can be outside of these ranges.

Any suitable ink vehicle can be employed. Suitable vehicles can include paraffins, microcrystalline waxes, polyethylene waxes, ester waxes, amides, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

In embodiments, the ink carrier further comprises a low melting wax. In embodiments, the low melting wax is a polyalkylene wax, a functional wax, or a combination thereof. The term "functional wax" is known to one of skill in the art and can mean herein any suitable functional wax, in embodiments, including, but not limited to, a wax with polar groups, for example, alcohols, amides, esters, urethanes, etc. As used herein, the term "low melting wax" includes any suitable low melting wax, including, in embodiments, a wax having a melting point of less than about 120° C.

Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

In embodiments, the low melting wax is present in the ink carrier in an amount of from about 25% to less than about 65% by weight based on the total weight of the ink carrier.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

Examples of suitable ink vehicles include, for example, ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR materials available from Baker Petrolite, including VYBAR 253 (Mn=520), VYBAR 5013 (Mn=420), and the like, may also be used. In addition, the ink vehicle may be an ethoxylated alcohol, such as available from Baker Petrolite and of the general formula

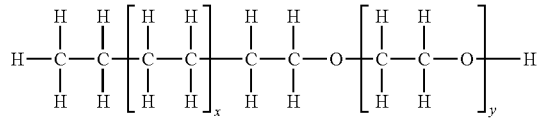

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, which is hereby incorporated herein by reference. Suitable monoamides may have a melting point of at least about 50° C., for example from about 50° C. to about 150° C., although the melting point can be outside these ranges. Specific examples of suitable monoamides include, for example, primary monoamides and secondary monoamides. Stearamide, such as KEMAMIDE S available from Witco Chemical Company and CRODAMIDE S available from Croda, behenamide/arachidamide, such as KEMAMIDE B available from Witco and CRODAMIDE BR available from Croda, oleamide, such as KEMAMIDE U available from Witco and CRODAMIDE OR available from Croda, technical grade oleamide, such as KEMAMIDE O available from Witco, CRODAMIDE O available from Croda, and UNISLIP 1753 available from Uniqema, and erucamide such as KEMAMIDE E available from Witco and CRODAMIDE ER available from Croda, are some examples of suitable primary amides. Behenyl behenamide, such as KEMAMIDE EX666 available from Witco, stearyl stearamide, such as KEMAMIDE S-180 and KEMAMIDE EX-672 available from Witco, stearyl erucamide, such as KEMAMIDE E-180 available from Witco and CRODAMIDE 212 available from Croda, erucyl erucamide, such as KEMAMIDE E-221 available from Witco, oleyl palmitamide, such as KEMAMIDE P-181 available from Witco and CRODAMIDE 203 available from Croda, and erucyl stearamide, such as KEMAMIDE S-221 available from Witco, are some examples of suitable secondary amides. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N'-ethylenebisoleamide).

High molecular weight linear alcohols, such as those available from Baker Petrolite and of the general formula

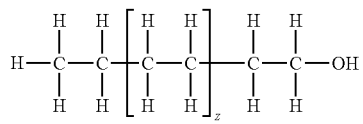

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

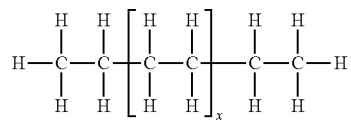

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Another example includes modified maleic anhydride hydrocarbon adducts of polyolefins prepared by graft copolymerization, such as those available from Baker Petrolite and of the general formulas

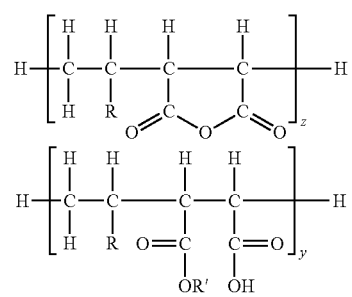

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

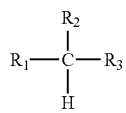

wherein $R_1$ and $R_3$ are hydrocarbon groups and $R_2$ is either of one of the general formulas

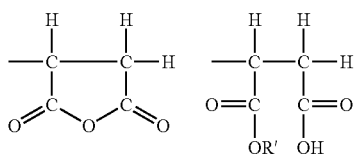

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of suitable ink vehicles for the phase change inks include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, which is incorporated herein by reference, may also be used. The ink vehicle may contain a branched triamide such as those described in U.S. Pat. No. 6,860,930, the disclosure of which is also incorporated by reference herein,

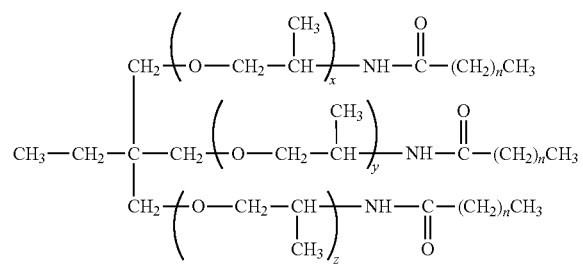

wherein n has an average value of from about 34 equal to or less than 40, where x, y and z can each be zero or an integer, and wherein the sum of x, y, and z is from about 5 and equal to or less than 6.

A plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, in one embodiment of at least about 0.05% by weight of the ink carrier, in another embodiment of at least about 1% by weight of the ink carrier, and in yet another embodiment of at least about 2% by weight of the ink carrier, and in one embodiment of equal to or less than about 15% by weight of the ink carrier, in another embodiment of equal to or less than about 10% by weight of the ink carrier, and in yet another embodiment of equal to or less than about 5% by weight of the ink carrier, although the amount can be outside of these ranges. Examples of suitable plasticizers include SANTICIZER® 278, SANTICIZER® 154, SANTICIZER®160, SANTICIZER® 261 (commercially available from Monsanto), and the like or mixtures thereof.

A hindered amine antioxidant is present in the ink in any desired or effective amount, in one embodiment of at least about 0.001 percent by weight of the ink carrier, in another embodiment of at least about 0.05 percent by weight of the ink carrier, and in yet another embodiment of at least about 0.10 percent by weight of the ink carrier, and in one embodiment of equal to or less than about 0.50 percent by weight of the ink carrier, in another embodiment of equal to or less than about 0.25 percent by weight of the ink carrier, and in yet another embodiment of equal to or less than about 0.15 percent by weight of the ink carrier, although the amount can be outside of these ranges.

Examples of suitable hindered amine antioxidants include those of general formula

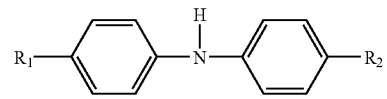

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=-CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in one embodiment of at least about 0.01% by weight of the ink carrier, in another embodiment of at least about 0.5% by weight of the ink carrier, and in yet another embodiment of at least about 1.5% by weight of the ink carrier, and in one embodiment equal to or less than about 4.0% by weight of the ink carrier, in another embodiment equal to or less than about 3.0% by weight of the ink carrier, and in yet another embodiment equal to or less than about 2.5% by weight of the ink carrier, although the amount can be outside of these ranges. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX®1076, IRGANOX® 1330 and the like. Mixtures of two or more of these hindered phenol antioxidants can also be employed.

A dispersant can be present in the ink in any desired or effective amount for purposes of dispersing and stabilizing the pigment, and the silica or alternative nanoparticles present in the ink vehicle. The dispersant is present in any desired or effective amount, in one embodiment of at least about 0.1% by weight of the ink carrier, in another embodiment of at least about 1% by weight of the ink carrier, and in one embodiment equal to or less than about 30% by weight of the ink carrier, in another embodiment equal to or less than about 20% by weight of the ink carrier, although the amount can be outside of these ranges. Specific examples of suitable dispersants are polyester dispersants such as those disclosed in U.S. Pat. No. 6,702,884, U.S. Pat. No. 6,841,590, the disclosures of which are totally incorporated herein by reference. Dispersants can include Solsperse 16000, Solsperse 28000, Solsperse 32500, Solsperse 38500, Solsperse 39000, Solsperse 54000, Solsperse 17000, Solsperse 17940 from Noveon, Inc. as well as mixtures thereof. Examples of suitable polyester dispersants are disclosed in U.S. Pat. No. 3,996,059 the disclosure of which is totally incorporated herein by reference. Where the dispersant is a polyester of the formula

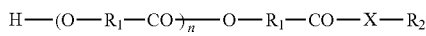

wherein each $R_1$ is an alkylene group, including linear, branched, saturated, unsaturated, cyclic, substituted, and unsubstituted alkyl groups containing at least 8 carbon atoms, such as from about 8 to about 40 carbon atoms or from about 8 to about 30 or from about 8 to about 20 carbon atoms, although the numbers can be outside these ranges, if substituted, substitutions can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

X is (i) an oxygen atom, (ii) an alkylene group which is attached to the carbonyl group through an oxygen or nitrogen atom with at least 2 carbon atoms; $R_2$ is (i) a hydrogen atom, (ii) a primary, secondary or tertiary amine group or a salt thereof with an acid, or a quaternary ammonium salt group; and n is an integer representing a number of repeating groups, for example from 2 to about 20 or from about 2 to about 10.

Another class of suitable dispersants include urethane derivatives of oxidized synthetic or petroleum waxes, such as those available from Baker Petrolite and of the general formulas

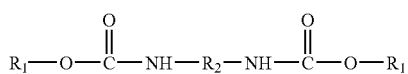

wherein $R_1$ is an alkyl group of the formula $CH_3(CH_2)_n$, n is an integer of from about 5 to about 200, for example from about 10 to about 150 or from about 10 to about 100 and $R_2$ is an arylene group, may also be used as the ink vehicle. These materials may have a melting point of from about 60° C. to about 120° C., such as from about 70° C. to about 100° C. or from about 70° C. to about 90° C. Commercial examples of such materials include, for example, Baker Petrolite CA-11 (Mn=790, Mw/Mn=2.2), Petrolite WB-5 (Mn=650, Mw/Mn=1.7), Petrolite WB-17 (Mn=730, Mw/Mn=1.8), and the like.

Other examples of suitable dispersants are polyalkylene succinimide dispersants such as those disclosed in U.S. Pat. No. 6,858,070, the disclosure of which is totally incorporated herein by reference. Dispersants can include the Chevron Oronite OLOA 11000, OLOA 11001, OLOA 11002, OLOA 11005, OLOA 371, OLOA 375, OLOA 411, OLOA 4500, OLOA 4600, OLOA 8800, OLOA 8900, OLOA 9000, OLOA 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. No. 3,172,892, U.S. Pat. No. 3,202,678, U.S. Pat. No. 3,280,034, U.S. Pat. No. 3,442,808, U.S. Pat. No. 3,361,673, U.S. Pat. No. 3,172,892, U.S. Pat. No. 3,912,764, U.S. Pat. No. 5,286,799, U.S. Pat. No. 5,319,030, U.S. Pat. No. 3,219,666, U.S. Pat. No. 3,381,022, U.S. Pat. No. 4,234,435, and European Patent Publication 0 776 963, the disclosures of each of which are totally incorporated herein by reference.

A rosin ester resin, mixtures thereof, or the like can also be included in the ink carrier. The rosin ester resin is present in the ink carrier in any desired or effective amount, in one embodiment of at least about 0.5% by weight of the ink carrier, in another embodiment of at least about 2% by weight of the ink carrier, and in yet another embodiment of at least about 3% by weight of the ink carrier, and in one embodiment of equal to or less than about 20% by weight of the ink carrier, in another embodiment equal to or less than about 15% by weight of the ink carrier, and in yet another embodiment equal to or less than about 10% by weight of the ink carrier, although the amount can be outside of these ranges. Examples of suitable rosin ester resins include PINECRYSTAL® KE-100 (commercially available from Arakawa), and the like.

The inks disclosed herein can be obtained by dispersing the surface modified silica dispersions into the ink components in such a manner as to maximize uniform dispersion and resist substantial aggregation. This can include slowly adding the nanoparticles in the molten inks while applying energy. Another method can include the step of removing a substantial portion of the solvent from the solvent-silica nanoparticles, and disseminating the silica dispersion within the ink carrier components. More specifically, the method for producing a low energy phase change ink composition can comprise combining together an ink carrier comprising a dispersion of nanoparticles comprising nanoparticles in a solvent and wax. The ink carrier exhibits a substantially uniform distribution of said nanoparticles discretely distributed therewithin, and exhibits a substantially increased resistance to aggregation of the nanoparticles distributed therewithin.

The ink carrier can be present in the phase change ink prepared in any desired or effective amount, in one embodiment in an amount of at least about 50% by weight of the ink, in another embodiment of at least about 70% by weight of the ink, and in yet another embodiment of at least about 90% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges.

In one specific embodiment, the ink carrier has a melting point of less than about 110° C., and in another embodiment of less than about 100° C., although the melting point of the ink carrier can be outside of these ranges.

The phase change ink compositions also contain a colorant. Any desired or effective colorant can be employed, including dyes, pigments, mixtures thereof, and the like, provided that the colorant can be dissolved or dispersed in the ink vehicle. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), Neozapon Black X51 [C.I. Solvent Black, C.I. 12195] (BASF), Sudan Blue 670 [C.I. 61554] (BASF), Sudan Yellow 146 [C.I. 12700] (BASF), Sudan Red 462 [C.I. 26050] (BASF), Intratherm Yellow 346 commercially available from Crompton and Knowles, C.I. Disperse Yellow 238, Neptune Red Base NB543 (BASF, C.I. Solvent Red 49), Neopen Blue FF-4012 commercially available from BASF, Lampronol Black BR commercially available from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are totally incorporated herein by reference, and commercially available from, for example, Milliken & Company as Milliken Ink Yellow 12, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the phase change inks. Examples of suitable pigments include Violet Toner VT-8015 (commercially available from Paul Uhlich); Paliogen Violet 5100 (commercially available from BASF); Paliogen Violet 5890 (commercially available from BASF); Permanent Violet VT 2645 (commercially available from Paul Uhlich); Heliogen Green L8730 (commercially available from BASF); Argyle Green XP-111-S (commercially available from Paul Uhlich); Brilliant Green Toner GR 0991 (commercially available from Paul Uhlich); Lithol Scarlet D3700 (commercially available from BASF); Toluidine Red (commercially available from Aldrich); Scarlet for Thermoplast NSD PS PA (commercially available from Ugine Kuhlmann of Canada); E.D. Toluidine Red (commercially available from Aldrich); Lithol Rubine Toner (commercially available from Paul Uhlich); Lithol Scarlet 4440 (commercially available from BASF); Bon Red C (commercially available from Dominion Color Company); Royal Brilliant Red RD-8192 (commercially available from Paul Uhlich); Oracet Pink RF (commercially available from Ciba-Geigy); Paliogen Red 3871K (commercially available from BASF); Paliogen Red 3340 (commercially available from BASF); Lithol Fast Scarlet L4300 (commercially available from BASF); Heliogen Blue L6900, L7020 (commercially available from BASF); Heliogen Blue K6902, K6910 (commercially available from BASF); Heliogen Blue D6840, D7080 (commercially available from BASF); Sudan Blue OS (commercially available from BASF); Neopen Blue FF4012 (commercially available from BASF); PV Fast Blue B2G01 (commercially available from American Hoechst); Irgalite Blue BCA (commercially available from Ciba-Geigy); Paliogen Blue 6470 (commercially available from BASF); Sudan III (commercially available from Red Orange) (commercially available from Matheson, Colemen Bell); Sudan II (commercially available from Orange) (commercially available from Matheson, Colemen Bell); Sudan Orange G (commercially available from Aldrich), Sudan Orange 220 (commercially available from BASF); Paliogen Orange 3040 (commercially available from BASF); Ortho Orange OR 2673 (commercially available from Paul Uhlich); Paliogen Yellow 152, 1560 (commercially available from BASF); Lithol Fast Yellow 0991K (commercially available from BASF); Paliotol Yellow 1840 (commercially available from BASF); Novoperm Yellow FGL (commercially available from Hoechst); Permanent Yellow YE 0305 (commercially available from Paul Uhlich); Lumogen Yellow D0790 (commercially available from BASF); Suco-Yellow L1250 (commercially available from BASF); Suco-Yellow D1355 (commercially available from BASF); Suco Fast Yellow D1355, D1351 (commercially available from BASF); Hostaperm Pink E (commercially available from American Hoechst); Fanal Pink D4830 (commercially available from BASF); Cinquasia Magenta (commercially available from Du Pont); Paliogen Black L0084 (commercially available from BASF); Pigment Black K801 (commercially available from BASF); and carbon blacks such as Regal 330® (commercially available from Cabot), Carbon Black 5250, Carbon Black 5750 (commercially available from Columbia Chemical), and the like.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, and U.S. Pat. No. 7,053,227, the disclosures of each of which are totally incorporated herein by reference.

The colorant is present in the phase change ink in any desired or effective amount to obtain the desired color or hue, in one embodiment at least about 0.1 percent by weight of the ink composition, and in another embodiment at least about 0.2 percent by weight of the ink composition, and in one embodiment no more than about 15 percent by weight of the ink composition, and in another embodiment no more than about 8 percent by weight of the ink composition, although the amount can be outside of these ranges.

The ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 cps, in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

Showthrough is defined herein as the increase in paper optical density (OD) (background subtracted) that results from the presence of a solid area image on the reverse side of the paper.

With regard to the subject inks, showthrough can be substantially reduced so that the printed image in one embodiment is equal to or less than about 0.07 optical density units, in another embodiment is equal to or less than about 0.06 optical density units, in a further embodiment is equal to or less than about 0.05 optical density units, and in a yet further embodiment is equal to or less than about 0.04 optical density units, although the level of showthrough can be outside of these ranges.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of pigment-based solid ink concentrate. A pigmented ink is prepared in the following manner. An ink base is first prepared by mixing the following components by melting and homogeneously blending them together in a 600 milliliter beaker at 120° C. using an overhead stirrer: 118.5 grams of a distilled polyethylene wax (PE 500, obtained from Baker Petrolite®, Tulsa, Okla., a polyethylene homopolymer with an average chain length of C-36), 29.7 grams of triamide wax (prepared as described in Example II of U.S. Pat. No. 6,860,930, which is incorporated by reference herein in its entirety), 0.3 grams Naugard® 445 (an antioxidant) available from Crompton Corp., and 2.23 grams Solsperse® 17000 polymeric dispersant available from Noveon Inc. The solution is transferred to a heated 01 Szegvari attritor having 1800 g ⅛" 440 C Grade 25 stainless steel balls that are preheated to 120° C. 7.82 grams of Permanent Rubine L5B 01 (PR57:1) pigment from Clariant Corporation is added slowly to the melted ink base. The dispersion is allowed to mix at 150 RPM for 4 hours to allow wetting of the particles.

Example 2

Preparation of Pigment-based Solid Ink Containing Nano Silica Particles. The following components are melted and mixed together in a 250 milliliter beaker: 32.13 grams of a distilled Polyethylene Wax from Baker Petrolite, 3.07 grams triamide wax (prepared as described in U.S. Pat. No. 6,860,930), 40.89 grams S-180 (a stearyl stearamide) commercially available from Crompton Corp., 23.51 g KE-100 resin, a glycerol ester of hydrogenated abietic (rosin) acid, commercially available from Arakawa Corporation, and 0.24 g Naugard-445 (an antioxidant) available from Crompton Corp. 3.68 g of H30TD (PDMS surface modified silica nano particle commercially available from Wacker-Chemie GmbH) is slowly added to the melted solution while stirring the ink with a Cowles-type blade at 4000 RPM for 60 minutes to enable dispersion of the nanoparticles.

127.8 grams of resultant pigmented ink concentrate from Example 1 is transferred to a heated 600 milliliter beaker where the above-melted ink components are added and stirred in manually. The ink is then allowed to be mixed with a Cowles-type blade at 4000 RPM for 4 hours to enable a high quality dispersion of the PR57:1 particles and the silica nanoparticles. The formulation of the pigmented ink is given in Table 1. The ink is filtered using a 1 micron filter available from Pall Corporation. The ink is characterized by measuring rheology on a Rheometrics Fluid Spectrometer RFS3 in a cone-plate geometry (50 mm). The resultant dispersion of silica nanoparticles and the PR57:1 particles is sufficiently stable to allow an assessment of jettability and print quality of the resulting prints.

TABLE 1

| Component | Amount |
|---|---|
| Distilled polyethylene wax, 500, Baker Petrolite | 55.64 |
| Triamide Wax* | 11.78 |

TABLE 1-continued

| Component | Amount |
| --- | --- |
| S-180 stearyl stearamide, Crompton Corporation | 17.78 |
| KE-100 hydrogenated rosin ester resin, Arakawa Corporation | 10.22 |
| Nauguard ® 445 Antioxidant | 0.21 |
| H30TD, PDMS surface modified silica nano particle, Wacker-Chemie GmbH | 0.80 |
| PR57:1, Permanent Rubine Pigment, Clariant Corporation | 2.50 |
| Solsperse ® 1700, polymeric dispersant, Noveon Inc. | 1.07 |
| Total | 100.00 |

*prepared as described in Example II of U.S. Pat. No. 6,860,930

Example 3

A pigmented ink with silica nano particles is prepared as in Example 2 except that H30TX (HMDS/PDMS surface modified silica nano particle) is used instead of H30TD.

Example 4

A pigmented ink with silica nano particles is prepared as in example 2 except that NANOBYK-3650 (31% dispersion in a 6/1 mixture of methoxy propyl acetate and methoxy propanol respectively) is used instead of H30TD. The mixing apparatus is then equipped with a stirrer and the ink is then allowed to stir at 120° C. for 2 hours to evaporate the solvent.

Example 5

Preparation of Dye-based Solid Ink Containing NanoSilica Particles. Xerox Phaser™ 8860 cyan ink (148.5 g) is melted at 120° C. in a 600 milliliter beaker in an oven for 2 hours. NANOBYK-3650 (3 g, 31% dispersion in a 6/1 mixture of methoxy propyl acetate and methoxy propanol respectively, obtained from BYK Chemie) is added drop-wise while stirring the ink with a Cowles-type blade at 4000 RPM for 60 minutes to enable dispersion of the nanoparticles. The mixing apparatus is then equipped with a stirrer and the ink is then allowed to stir 120° C. for 2 hours to evaporate the solvents. The ink is filtered through a 1 micron filter available from Pall Corporation. The ink is characterized by measuring rheology on a Rheometrics Fluid Spectrometer RFS3 in a cone-plate geometry (50 millimeters). The resultant dispersion of silica nanoparticles is sufficiently stable to allow an assessment of jettability and print quality of the resulting prints.

Example 6

A dye based ink with silica nano particles is prepared as in Example 5 except that H30TX (1.5 g, HMDS/PDMS surface modified silica nano particle) is used instead of NANOBYK-3650 and there is no solvent evaporation process because H30TX is a powder.

Example 7

A dye based ink with silica nano particles is prepared as in Example 5 except that H30TD (1.5 g, PDMS surface modified silica nano particle) is used instead of NANOBYK-3650 and there is no solvent evaporation process because H30TD is a powder.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An ink carrier comprising:
a dispersion of at least one of silica nanoparticles surface modified with a hydrophobic group or metal oxide nanoparticles surface modified with a hydrophobic group, said dispersion exhibiting a substantially uniform distribution of said nanoparticles discretely distributed therewithin, said ink carrier being resistant to substantial aggregation of said nanoparticles distributed therewithin.

2. A phase change ink comprising a colorant and the ink carrier of claim 1.

3. A phase change ink comprising a colorant and the ink carrier of claim 1, wherein the colorant is a pigment.

4. A phase change ink comprising a colorant and the ink carrier of claim 1, wherein the colorant is a dye.

5. The ink carrier of claim 1, wherein the hydrophobic group is an alkyl group, an arylalkyl or an alkylaryl group.

6. The ink carrier of claim 1, wherein the hydrophobic group is an alkyl group, an arylalkyl or an alkylaryl group with at least one heteroatom.

7. The ink carrier of claim 6, wherein the hydrophobic group is polydimethyl siloxane.

8. The ink carrier of claim 6, wherein the hydrophobic group is hexadimethyl silane.

9. An ink composition according to claim 1, wherein said ink carrier further comprises a low melting wax.

10. An ink composition according to claim 9, wherein the low melting wax is a polyalkylene wax, a functional wax, or a combination thereof.

11. An ink composition according to claim 1, wherein the surface modified nanoparticles are present in the ink carrier in an amount equal to or less than about 40% by weight based upon the total weight of the ink carrier.

12. An ink composition according to claim 9, wherein the low melting wax is present in the ink carrier in an amount of from about 25% to less than about 65% by weight based on the total weight of the ink carrier.

13. A method for producing an ink carrier comprising:
forming a dispersion of at least one of silica nanoparticles surface modified with a hydrophobic group and metal oxide nanoparticles surface modified with a hydrophobic group; and
forming an ink carrier comprising said dispersion of nanoparticles, the ink carrier exhibiting a substantially uniform distribution of said nanoparticles discretely distributed therewithin, and having a substantially increased resistance to aggregation of said nanoparticles distributed therewithin.

14. A method according to claim 13, wherein said ink carrier is combined with a colorant to form a phase change ink.

15. The method according to claim 14, wherein said colorant is a pigment.

16. The method according to claim 14, wherein said colorant is a dye.

17. The method according to claim 13, further comprising:
melt mixing the ink components and slowly adding the silica to the melted solution while vigorously stirring the ink to enable dispersion of the nanoparticles.

18. The method according to claim 13, wherein said ink carrier further comprises a low melting wax.

19. A method which comprises:
incorporating into an ink jet printing apparatus a low energy phase change ink composition comprising a dispersion of at least one of silica nanoparticles surface modified with a hydrophobic group or metal oxide nanoparticles surface modified with a hydrophobic group, the ink carrier exhibiting a substantially uniform distribution of said nanoparticles discretely distributed therewithin, and having a substantial resistance to aggregation of said nanoparticles distributed therewithin, and a colorant;
melting the ink composition; and
causing droplets of the melted ink to be ejected in an imagewise pattern onto a substrate.

20. The method according to claim 19, wherein the substrate is a final recording sheet and droplets of the melted ink are ejected in an imagewise pattern directly onto the final recording sheet.

21. The method according to claim 19, wherein the substrate is an intermediate transfer member and droplets of the melted ink are ejected in an imagewise pattern onto the intermediate transfer member followed by transfer of the imagewise pattern from the intermediate transfer member to a final recording sheet.

22. The method according to claim 21, wherein the intermediate transfer member is heated to a temperature above that of the final recording sheet and below that of the melted ink in the printing apparatus.

* * * * *